United States Patent
Le

(10) Patent No.: US 12,537,112 B2
(45) Date of Patent: *Jan. 27, 2026

(54) METHOD OF DETECTING AN EXISTENCE OF A LOOSE PART IN A STEAM GENERATOR OF A NUCLEAR POWER PLANT

(71) Applicant: Westinghouse Electric Company LLC, Cranberry Township, PA (US)

(72) Inventor: Qui V. Le, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1241 days.

This patent is subject to a terminal disclaimer.

(21) Appl. No.: 17/152,157

(22) Filed: Jan. 19, 2021

(65) Prior Publication Data
US 2021/0241931 A1    Aug. 5, 2021

Related U.S. Application Data

(63) Continuation of application No. 13/343,067, filed on Jan. 4, 2012, now Pat. No. 10,896,767.
(Continued)

(51) Int. Cl.
*G21C 17/017* (2006.01)
*F22B 37/00* (2006.01)
(Continued)

(52) U.S. Cl.
CPC .......... *G21C 17/017* (2013.01); *F22B 37/002* (2013.01); *G01N 27/902* (2013.01);
(Continued)

(58) Field of Classification Search
CPC ........ Y02E 30/30; G21D 3/001; G21D 1/006; G21C 19/207; G21C 17/017; G01N 27/902; F22B 37/002
(Continued)

(56) References Cited

U.S. PATENT DOCUMENTS 4,194,149 A    3/1980    Holt et al.
4,567,012 A    1/1986    Radcliff
(Continued)

FOREIGN PATENT DOCUMENTS

CN    87104369 A    3/1988
EP    0501648 A2    9/1992

OTHER PUBLICATIONS

Steam generator foreign object task force review material, EPRI 1012921 Technical update, Mar. 2006 (Year: 2006).*
(Continued)

*Primary Examiner* — Aditya S Bhat
(74) *Attorney, Agent, or Firm* — K&L Gates LLP

(57) ABSTRACT

A plurality of signal anomalies are identified in a number of tubes in a steam generator. Since the geometry of the steam generator is known, the location of each signal anomaly along each tube is converted into a location within the interior of the steam generator. If a plurality of signal anomalies are at locations within the steam generator that are within a predetermined proximity of one another, such a spatial confluence of signal anomalies is determined to correspond with a loose part situated within the steam generator. Additional methodologies can be employed to confirm the existence of the loose part. Historic tube sheet transition signal data can be retrieved and subtracted from present signals in order to enable the system to ignore the relatively strong eddy current sensor signal of a tube sheet which would mask the relatively weak signal from a loose part at the tube sheet transition.

21 Claims, 2 Drawing Sheets

Related U.S. Application Data

(60) Provisional application No. 61/472,651, filed on Apr. 7, 2011.

(51) Int. Cl.
*G01N 27/9013* (2021.01)
*G21C 19/20* (2006.01)
*G21D 1/00* (2006.01)
*G21D 3/00* (2006.01)

(52) U.S. Cl.
CPC ........... *G21C 19/207* (2013.01); *G21D 1/006* (2013.01); *G21D 3/001* (2013.01); *Y02E 30/30* (2013.01)

(58) Field of Classification Search
USPC ........................................................ 702/185
See application file for complete search history.

(56) References Cited

U.S. PATENT DOCUMENTS

| | | | |
|---|---|---|---|
| 4,687,992 A | 8/1987 | von Bernus et al. | |
| 4,763,274 A * | 8/1988 | Junker | G01N 27/9046 324/76.78 |
| 4,783,306 A | 11/1988 | Vecsey et al. | |
| 4,856,337 A | 8/1989 | Metala et al. | |
| 5,343,507 A | 8/1994 | Arnold et al. | |
| 5,821,747 A | 10/1998 | Atherton et al. | |
| 6,519,535 B1 * | 2/2003 | Petri | B21C 51/00 702/42 |
| 6,624,533 B1 | 9/2003 | Swanson et al. | |
| 6,959,267 B2 | 10/2005 | Le | |
| 9,588,082 B2 * | 3/2017 | Pollock | F22B 1/162 |
| 12,259,293 B2 * | 3/2025 | Kivi | G01M 5/0041 |
| 2002/0153883 A1 | 10/2002 | Hur et al. | |
| 2003/0079157 A1 | 4/2003 | Lee et al. | |
| 2003/0169419 A1 | 9/2003 | Lewis et al. | |
| 2004/0257072 A1 * | 12/2004 | Samson | G01N 27/902 324/238 |
| 2005/0154564 A1 * | 7/2005 | Le | G01N 27/902 702/189 |
| 2007/0018661 A1 | 1/2007 | Lee et al. | |
| 2007/0051125 A1 | 3/2007 | Chlusolo et al. | |
| 2007/0125175 A1 * | 6/2007 | Junker | G01N 29/348 73/632 |
| 2008/0007257 A1 | 1/2008 | Wyatt et al. | |
| 2009/0150093 A1 | 6/2009 | Junker et al. | |
| 2010/0185576 A1 | 7/2010 | Strizzi et al. | |

OTHER PUBLICATIONS

International Preliminary Report on Patentability for International PCT Application No. PCT/US2012/023912 dated Oct. 8, 2013.
Supplementary European Search Report for European Patent Application No. 1276868.1 dated Aug. 22, 2014.
Bakhtiari et al., Technical Letter Report: Characterizing Steam Generator Tube Degradation Mechanisms with Eddy Current Technology, NRC Contract Y6588, Jul. 2007, pp. 1-54.
International Search Report and Written Opinion for International PCT Application No. PCT/US2012/023912 dated May 25, 2012.

* cited by examiner

METHOD OF DETECTING AN EXISTENCE OF A LOOSE PART IN A STEAM GENERATOR OF A NUCLEAR POWER PLANT

CROSS-REFERENCE TO RELATED APPLICATIONS

This application is a continuation application claiming priority under 35 U.S.C. § 120 to U.S. patent application Ser. No. 13/343,067, entitled METHOD OF DETECTING AN EXISTENCE OF A LOOSE PART IN A STEAM GENERATOR OF A NUCLEAR POWER PLANT, which claims benefit under 35 U.S.C. § 119 (e) to U.S. Provisional Patent Application Ser. No. 61/472,651 filed Apr. 7, 2011, and entitled "Advance Loose Part Detection Algorithm (ALPDA)", the entire disclosures of which are hereby incorporated by reference herein.

BACKGROUND OF THE INVENTION

Field

The invention relates generally to nuclear power plants and, more particularly, to a method of evaluating the tubes of a steam generator of a nuclear power plant.

Description of the Related Art

Nuclear power plants are generally well known. Nuclear power plants can generally be stated as comprising a reactor that includes one or more fuel cells, a primary loop that cools the reactor, and a secondary loop that drives a steam turbine which operates an electrical generator. Such nuclear power plants typically additionally include a heat exchanger between the primary and secondary loops. The heat exchanger typically is in the form of a steam generator which comprises tubes that carry the primary coolant and a plenum that carries the secondary coolant in heat-exchange relationship with the tubes and thus with the primary coolant.

As is also generally known, the tubes of a steam generator are subject to wear due to corrosion, mechanical vibration of the steam generator components or of loose parts which might become stuck among the tubes of the steam generator, and other mechanisms. It thus is necessary to periodically inspect the tubes of a steam generator for wear in order to avoid failure of a tube which might result in nuclear contamination of the secondary loop, by way of example. While numerous methodologies have been employed for performing such inspection, such methodologies have not been without limitation.

One method of inspecting the tubes of a steam generator involves the insertion of an eddy current sensor into one or more of the tubes and to receive from the eddy current sensor a signal which typically is in the form of a voltage and a phase angle. An analyst reviewing the signal data typically must possess a high degree of expertise in order to accurately ascertain from the signal data the current condition of the tubes of the steam generator. A typical steam generator might possess between three thousand and twelve thousand tubes, by way of example, with each tube being several hundred inches in length. Thus, the review of eddy current data can require the expenditure of large amounts of time by an analyst. While certain testing protocols may require the testing of fewer than all of the tubes of a steam generator, depending upon the particular protocol, the time in service, and other factors, the analysis of such data still requires significant time and expense.

While loose parts within the steam generator pose a great risk of damage to the tubes, loose parts have been difficult to identify since their sizes and shapes are typically unknown, and the resultant changes in eddy current signals due to loose parts are thus likewise unknown. Furthermore, such loose parts often become lodged between tubes at the tube sheet transition, which is the region at which the tubes pass out of a tube sheet. Since the tube sheet typically is a slab of stainless steel that may be, for instance, twenty-three inch thick, the tube sheet generates a large eddy current which typically will mask the presence of a loose part lying at the tube sheet transition. It thus would be desirable to provide an improved system for detecting an existence of a loose part among the tubes of a steam generator.

SUMMARY OF THE INVENTION

Accordingly, the invention relates to an improved method of detecting an existence of a loose part within a steam generator of a nuclear power plant. A plurality of signal anomalies are identified in a number of tubes in a steam generator. Since the geometry of the steam generator is known, the location of each signal anomaly along any given tube is converted into a location within the interior of the steam generator. If a plurality of signal anomalies are at locations within the steam generator that are within a predetermined proximity of one another, such a spatial confluence of signal anomalies is determined to correspond with a loose part situated within the steam generator. Additional methodologies can be employed to confirm the existence of the loose part. Moreover, historic tube sheet transition signal data can be retrieved and subtracted from present signals in order to enable the system to ignore the relatively strong eddy current sensor signal of a tube sheet which would otherwise mask the relatively weak eddy current sensor signal from a loose part at the tube sheet transition.

Accordingly, an aspect of the invention is to provide an improved method of detecting an existence of a loose part within a steam generator of a nuclear power plant.

Another aspect of the invention is to provide such a method that non-destructively detects the loose part.

Another aspect of the invention is to provide an improved method that employs a plurality of signal anomalies occurring within a predetermined spatial proximity of one another within a steam generator and that determines therefrom that a loose part exists in the vicinity of the signal anomalies.

These and other aspects of the invention can be generally described as relating to an improved method of non-destructively detecting an existence of a loose part within a steam generator of a nuclear power plant wherein the steam generator has a plurality of tubes. The method can be generally stated as including identifying a first signal anomaly at a first tube position along a first tube, with the first tube position along the first tube being at a first generator location within the seam generator, identifying a second signal anomaly at a second tube position along a second tube, with the second tube position along the second tube being at a second generator location within the seam generator, making a determination that the first generator location and the second generator location are within a predetermined proximity of one another and, responsive to the determination, determining that a loose part exists in the vicinity of the first and second generator locations.

BRIEF DESCRIPTION OF THE DRAWINGS

A further understanding of the invention can be gained from the following Detailed Description when read in conjunction with the accompanying drawings in which.

Similar numerals refer to similar parts throughout the specification.

DETAILED DESCRIPTION

Figure 1:
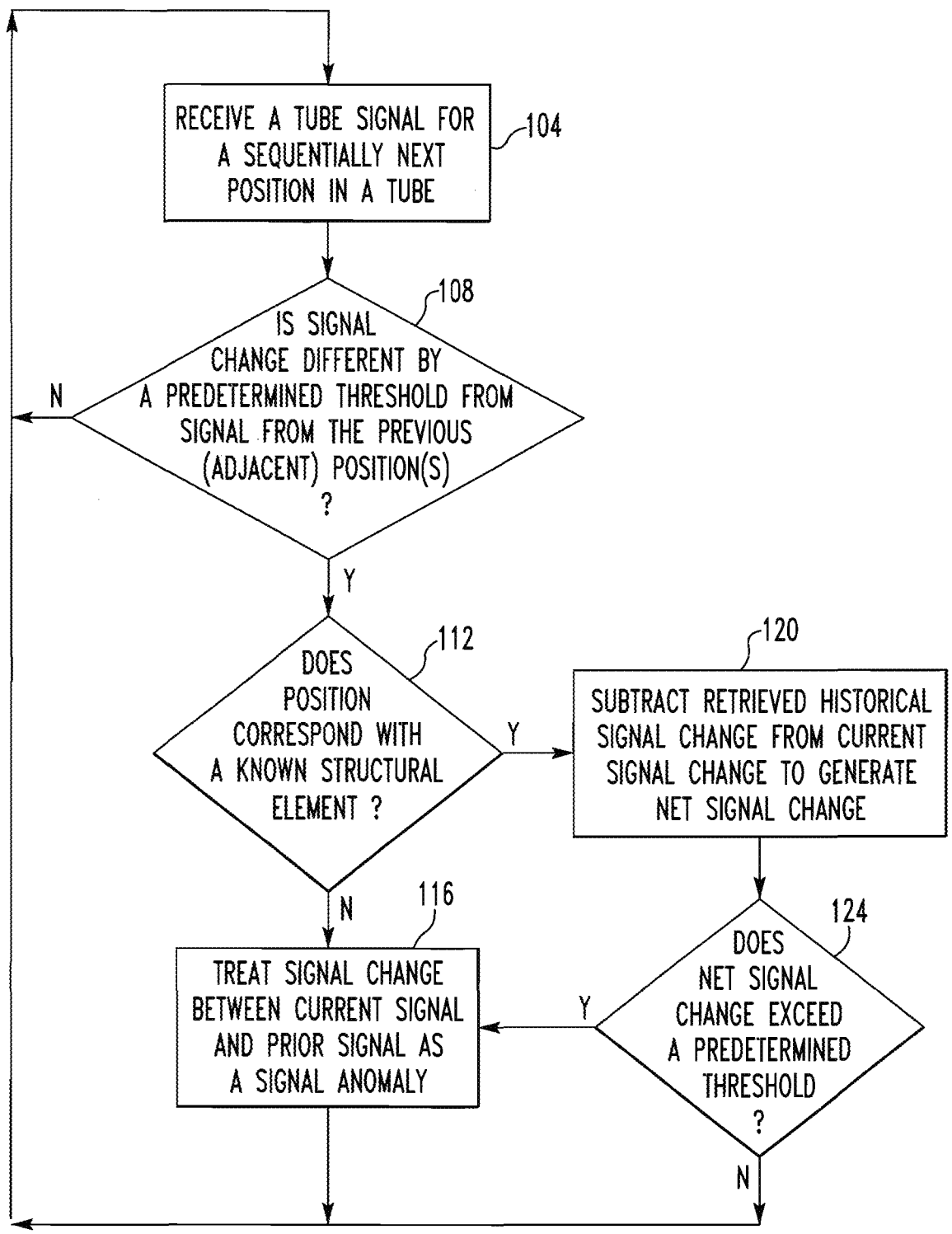
FIG. 1 is a flowchart depicting certain aspects of the invention.

Certain aspects of the methodologies employed herein involve the collection of data with the use of an eddy current sensor that is received within the interior of an elongated tube of a steam generator and that is passed through the interior of the tube along the longitudinal extent thereof. Longitudinal movement of the sensor can be performed manually, although it can also be advantageously performed by a robotically-controlled advancement mechanism that advances the eddy current sensor at a controlled rate. The eddy current sensor is capable of providing separate and contemporaneously generated data streams from its multiple channels at various longitudinal positions of the eddy current sensor along the tube at any given time. Other data streams from the eddy current sensor typically comprise a voltage component that characterizes an amplitude and another component that characterizes a phase angle. Although many methodologies can be employed for the storage and analysis of such data streams, one methodology involves the storage of voltage and phase angle data at given points along the longitudinal length of a tube for each of the multiple data channels. Typically, thirty data points per inch are collected and stored, but other data distributions and densities can be employed without departing from the present concept.

As is generally understood, a typical steam generator includes a plenum that encloses perhaps four thousand to twelve thousand individual tubes that each comprise a hot leg and a cold leg that pass through a tube sheet, which is itself a slab of metal that is typically twenty or more inches thick. Each tube may be several hundred inches long and have either a single U-bend or a pair of elbow bends, although other geometries can be employed without departing from the present concept. Each such tube typically additionally includes twenty to thirty physical supports of differing geometries. During initial manufacture, the hot and cold legs of each tube are assembled to the tube sheet by receiving the two ends of the tube in a pair of holes drilled through the tube sheet and by hydraulically bulging the ends of the tube into engagement with the cylindrical walls of the drilled holes.

While the geometry of each tube of a steam generator typically is different from nearly every other tube of the steam generator, the overall construction of the steam generator enables generalizations to be made with regard to the geometry of the tubes as a whole. That is, each tube can be said to include a pair of tube sheet transitions at the ends thereof which typically are characterized by an eddy current sensor voltage on the order of thirty (30.0) volts. Between the two tube sheet transitions are various straight runs, supports, and bends. The typical eddy current voltage for a straight section of tube is 0.05 volts, and the typical voltage for a bend of a tube is 0.1 volts. A typical voltage for a support may be 0.2 volts, but various types of supports can exist within a given steam generator, all of which may produce different characteristic voltages.

As the eddy current sensor is sequentially moved through each tube, and voltage and phase angle signals are detected on each of a plurality of data channels, the data signals at sequential positions along the tubes often do not vary widely. However, if a loose part is situated at the exterior of any given tube, i.e., within the interior of the steam generator, the voltage and/or phase angle signal values can change significantly in the vicinity of the loose part, and the change in signal can be detected on most if not all of the various data channels of the eddy current sensor. A change (of sufficient magnitude) in the signal from a current position of the eddy current sensor compared with one or more previous, i.e., adjacent, positions along the tube of the eddy current sensor can be considered to be a signal anomaly.

Other types of signal anomalies can exist. For instance, a change in a signal at a given location in a tube may be different by a predetermined amount from the recorded historical values of signals detected at the same location during a prior test. Another signal anomaly can be discerned by eliminating known larger components of a signal that would mask the unknown relatively smaller component of the signal that is represented by a loose part in the vicinity of a tube. Other types of signal anomalies will be apparent to one of ordinary skill in the relevant art.

An exemplary flowchart depicting certain methodologies for detecting signal anomalies is depicted generally in FIG. 1. Processing can be said to begin, by way of example, at 104 where a tube signal is received for a sequentially next position in a tube. If processing is at the beginning of a tube, the process would begin with an initial position which, after some of the processing mentioned below, would be followed by a movement of the eddy current sensor and the receiving, as at 104, of a tube signal from a sequentially next position in the tube from the initial position.

It is then determined, as at 108, whether the voltage or phase angle or both, for instance, of the signal from the current position of the eddy current sensor is different by a predetermined threshold from the signals at one or more previous, i.e., adjacent, positions. In the exemplary embodiment depicted herein, the predetermined threshold of such a signal change would be a change in voltage of at least fifty percent between adjacent positions and/or a change in phase angle of at least forty-five degrees, but these thresholds are exemplary only, and other thresholds can be employed. Moreover, the threshold potentially can be met if the change occurs across more than two locations, i.e., such as if the predetermined threshold in voltage change occurs across four sequential positions of the eddy current sensor.

If no signal change of a magnitude that meets or exceeds the predetermined threshold is detected at 108, processing returns to 104 where eddy current sensor signals are received for a sequentially next tube position. However, if a signal change meets or exceeds the predetermined threshold at 108, processing continues, as at 112, where it is determined whether the signal change potentially can be attributed to a known structural element. For example, structures such as the tube sheet transition, the known support braces within the interior of the steam generator, and other such structures might result in such a signal change as was detected at 108. If it is determined at 112 that no such known structural element exists that could cause the signal change, processing continues, as at 116, where the signal change that was detected at 108 is treated as a signal anomaly. Processing then continues, as at 104, where signals are received from the eddy current sensor at the next sequential position in the tube.

On the other hand, if it is determined at 112 that a known structural element might correspond with the current position of the eddy current sensor, processing continues, as at 120, where historical signal change data (that has been retrieved from a memory or other storage) is compared with the current signal, such as by subtracting one from the other, in order to generate a net signal change data set. Alternatively, data from a model of the steam generator that predicts the signal changes at various locations within the tubes can be employed in order to create the net signal change data set.

It is then determined, as at 124, whether the net data signal exceeds a predetermined threshold for signal change. The threshold may or may not be the same as the threshold employed at 108. In this regard, and by way of example, such a structure may be anticipated to develop sludge, which can affect an eddy current sensor signal, but which is not of the same level of concern as a loose part. The threshold employed at 124 may be higher than at 108 due to the expected signal change from the anticipate sludge. In this regard, a gradual change in signal at a given location (compared with historical signal data at the same location) may be indicative of sludge whereas a more sudden change may be indicative of the sudden appearance of a loose part at the location. On the other hand, the threshold may be lower because the structure may likewise be anticipated to trap a loose part. In any event, an appropriate threshold is employed at 124, and it may be different from the threshold employed at 108.

If it is determined at 124 that the threshold has been met, the net signal change is treated as a signal anomaly at 116, and the processing continues as at 104. Alternatively, if the predetermined threshold is not met at 124, the net signal change is effectively ignored by returning the processing to 104.

It is to be understood that the logic demonstrated generally in FIG. 1 is intended merely as an example of one fashion in which large amounts of eddy current signal data can be screened to identify signal anomalies which can be further processed as will be set forth in greater detail below. Other methodologies for identifying signal anomalies will likely be apparent to one of ordinary skill in the art and may depend upon the specific features and characteristics of the nuclear power plant and the relevant steam generator where the analysis is being performed.

Once the various signal anomalies have been identified, as is demonstrated generally in FIG. 1 or otherwise, the positions of the signal anomalies along the various tubes must be converted into locations within the interior of the steam generator. That is, each tube typically has its own individual three-dimensional shape within the interior of the steam generator, and the signal anomaly data typically is in the form of a particular position or set of positions disposed at a linear distance along the longitudinal extent of a particular tube. Since the geometry of the steam generator is known and is stored in a storage medium (such as in a memory or otherwise) the model of the steam generator is employed to convert the position of each signal anomaly along each particular tube into a three-dimensional location within the interior of the steam generator.

Figure 2:
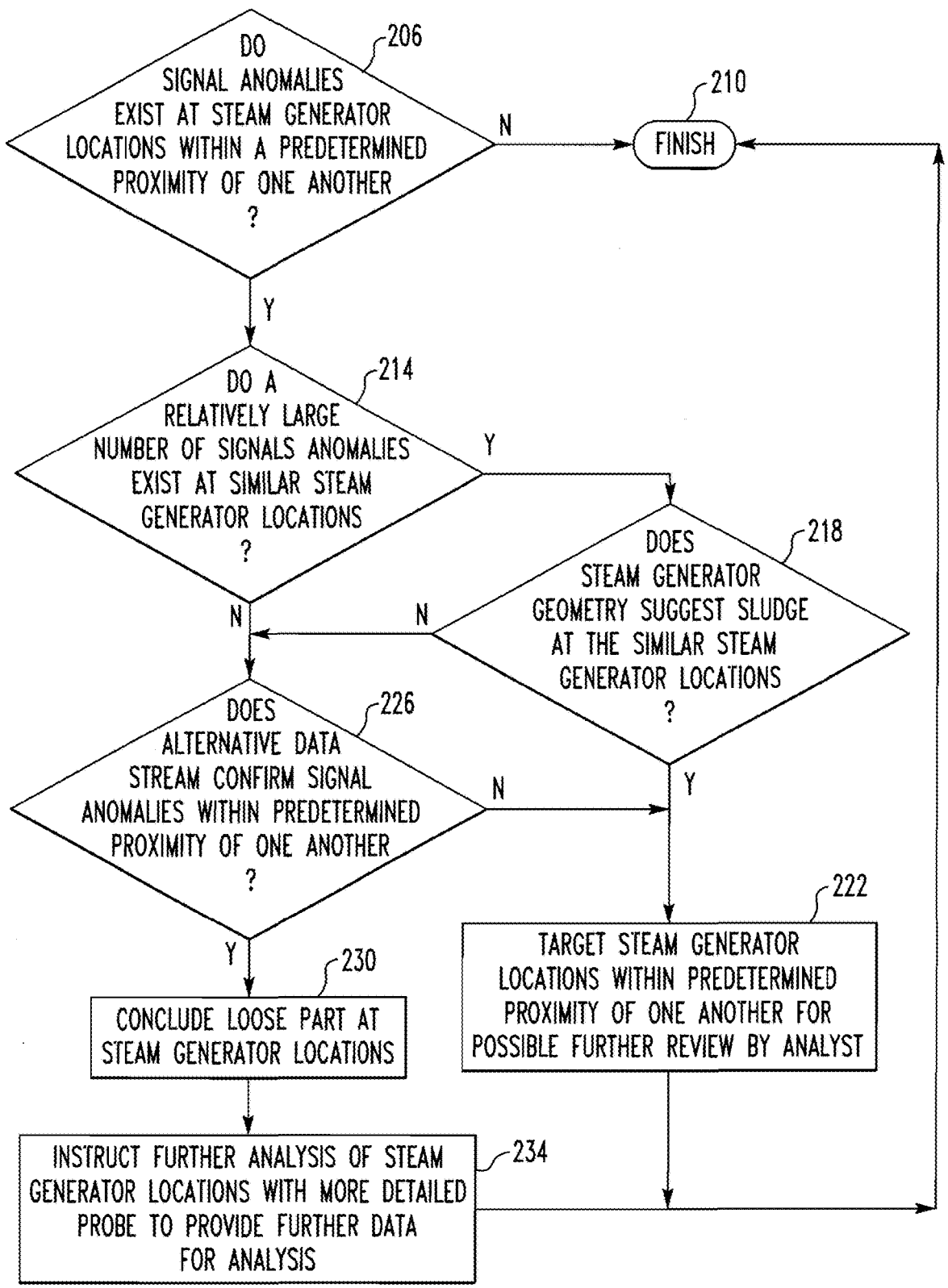
FIG. 2 is a flowchart depicting certain other aspects of the invention.

As has been suggested above, and as will be set forth in greater detail below in the context of FIG. 2, it has been advantageously determined that if a plurality of signal anomalies occur within a given proximity of one another within the interior of the steam generator, such signal anomalies indicate the existence of a loose part in the vicinity of the signal anomalies. That is, loose parts typically are of unknown shapes and sizes which are nearly always unknown in advance, and difficulty has been encountered in detecting the existence of a loose part based merely upon a signal anomaly in a given tube. However, by analyzing the steam generator as a whole, and by considering the spatial coincidence of multiple signal anomalies, the occurrence of a plurality of signal anomalies within a given proximity of one another within the interior of a steam generator has advantageously been discovered to correspond with a loose part situated in the vicinity of the locations of the signal anomalies.

The predetermined proximity that is employed in any given application can vary greatly depending upon many factors, such as the geometry of the steam generator, the various construction features of the steam generator, and other such factors. An exemplary predetermined proximity that is employed herein is a proximity of 2.0, meaning a distance between a pair of tubes that are spaced as far apart from one another as twice the average column width or the average row height of the tube sheet (for distances in the same plane as the tube sheet transition), or at most the same distance in other diagonal or vertical directions. It is noted, however, that virtually any value for a predetermined proximity can be employed, it being understood that the greater the predetermined proximity that is allowed, the greater will be the number of possible loose parts that are identified and the corresponding further analysis that must be performed to confirm the existence of such loose parts. It thus will be apparent that the identification of an optimum predetermined proximity will typically be specific to each individual steam generator and might be the result of an educated guess by a skilled technician based upon the technician's experience with a particular steam generator and with other steam generators.

Once the predetermined proximity has been established, processing can begin, as at 206, where it is determined whether the data stream has resulted in two or more signal anomalies that are situated at locations within the steam generator that are within the predetermined proximity of one another. If no such anomalies coexist, processing continues, as at 210, where processing is completed.

On the other hand, if a plurality of such signal anomalies are identified at 206, processing continues, as at 214, where it is determined whether a relatively large number of signal anomalies exist within the predetermined proximity. In this regard, it is reiterated that sludge can develop at various locations within the interior of the steam generator, and sludge can result in a change in voltage or phase angle in the eddy current data streams. If a significant proportion of the tubes can be said to have a similar signal anomaly at similar steam generator locations, this might be indicative of the development of sludge. For example, sludge can develop at the tube sheet transition or on supporting structures within the interior of the steam generator. Even a substantial minority of signal anomalies, such as twenty-five anomalies within a population of several thousand tubes within a steam generator likely would be indicative of sludge.

As such, if it is determined that a relatively large number of signal anomalies exist at similar steam generator locations, as in 214, processing continues, as at 218 where it is determined whether the steam generator geometry itself suggests the formation of sludge at such locations. By way of example, if the various locations within the steam generator were all in the vicinity of the top of the tube sheet, this likely would suggest the existence of sludge. If the development of sludge is suggested by the steam generator geometry, as at 218, processing continues, as at 222, where the steam generator locations are targeted for possible further review by an analyst. That is, the development of sludge is not of the same magnitude of concern as the existence of a loose part, but it may still be worthwhile for an analyst to review the finding manually in order to confirm the existence of sludge rather than a loose part. Processing then continues, as at 210.

On the other hand, if it was determined at 218 that the steam generator geometry does not suggest the development of sludge, processing continues at 226. Moreover, if at 214 a relatively large number of signal anomalies are determined to not exist at similar generator locations, processing similarly continues at 226. At 226, an alternative data stream is checked to see whether its signals confirm the signal anomalies that were detected as in FIG. 1 or otherwise. That is, and has been mentioned above, the eddy current sensor has multiple data channels. It is understood that the various data channels operate at various frequencies and return data contemporaneously across the various channels. If the signal anomalies that are determined at 206 to be within a predetermined proximity of one another resulted from data obtained from a first data channel, an alternative data channel will be consulted at 226 to determine whether it confirms the existence of such signal anomalies at the same locations.

If it is determined at 226 that the alternative data stream has confirmed the existence of a loose part, it is then concluded, as at 230, that a loose part exists in the steam generator at the locations of the various signal anomalies, or at least in the vicinity thereof. It is then instructed, as at 234, to perform further analysis of the steam generator locations with a more detailed probe and/or with other more detailed analysis in order to determine with a greater degree of precision the nature of the loose part and the possible damage that has occurred to the various tubes of the steam generator.

On the other hand, if at 226 the alternative data streams are inconclusive or are unable to confirm the signal anomalies at the identified locations, processing continues, as at 222, where the various steam generator locations are targeted for possible further review by an analyst to determine whether a different significance can be attributed to the spatial coincidence of the signal anomalies.

By employing the locations of signal anomalies within the steam generator, the proximity of such signal anomalies can indicate the existence of a loose part within the interior of the steam generator. With the use of historic data, certain strong signals can be ignored or adjusted in order to avoid having such strong signals mask the otherwise weak signal that might result from a loose part. Also, signal anomalies can be detected merely by detecting a change in signal along the length of a tube when known structures or other features of the steam generator cannot be said to be the cause of such a signal change.

It is understood that the analysis described herein can be performed on a digital computer or other processor of a type that is generally known. For instance, such a computer might include a processor and a memory, with the memory having stored therein one or more routines which can be executed on the processor. The memory can be any of a wide variety of machine readable storage media such as RAM, ROM, EPROM, EEPROM, FLASH, and the like without limitation. The signal from the eddy current sensor might be received by an analog-to-digital converter which provides a digital input to an input apparatus of the computer for processing and storage of the signals with a processor apparatus. The historic and current data can be stored on any such storage media and can potentially be transported or transmitted for use on other computers or processors as needed. The computer will have one or more routines stored therein that include instructions which, when executed on a processor of the processor apparatus, cause the computer to perform some or all of the operations mentioned above.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of non-destructively detecting an existence of a loose part within a steam generator of a nuclear power plant, the steam generator having a plurality of tubes within an interior thereof, the method comprising:
    detecting, via an eddy current sensor, a first eddy current indicative of an electromagnetic field through the eddy current sensor;
    generating, via the eddy current sensor, a first eddy current signal indicative of the detected eddy current;
    processing, via a processor, the first eddy current signal to detect a first signal anomaly at a first tube position along a first tube from among the plurality of tubes;
    converting the first tube position along the first tube into a three-dimensional first anomaly location within the interior of the steam generator;
    detecting, via the eddy current sensor, a second eddy current indicative of an electromagnetic field through the eddy current sensor;
    generating, via the eddy current sensor, a second eddy current signal indicative of the detected second eddy current;
    processing, via the processor, the second eddy current signal to detect a second signal anomaly at a second tube position along a second tube from among the plurality of tubes different from the first tube, and converting the second tube position along the second tube into a three-dimensional second anomaly location within the interior of the steam generator;
    comparing the first anomaly location and second anomaly location;
    determining that the first anomaly location and the second anomaly location are within a predetermined proximity of one another;
    determining that a loose part exists in the vicinity of the first and second anomaly locations based at least in part upon the first and second signal anomalies and the determination that the first anomaly location and the second anomaly location are within the predetermined proximity of one another;
    initiating an inspection of the steam generator in the vicinity of the first and second anomaly locations to determine a degree of damage that has occurred to at least one tube of the plurality of tubes;
    repairing the at least one tube of the plurality of tubes based on the inspection of the steam generator.

2. The method of claim 1, further comprising employing a first type of detection in the identifying of the first and second signal anomalies and, responsive to the determining that a loose part exists, instructing a further analysis of at least the first and second tube positions with a second type of detection different from the first type of detection.

3. The method of claim 1, further comprising:
identifying the first and second signal anomalies from a data stream output by a data source that contemporaneously generated the data stream and at least one alternative data stream; and
confirming the existence of the loose part by:
identifying from the at least one alternative data stream an alternative first signal anomaly at the first tube position along the first tube, and
identifying from the at least one alternative data stream an alternative second signal anomaly at the second tube position along the second tube.

4. The method of claim 1, further comprising detecting as the first signal anomaly a signal change between a signal from a data stream with respect to the first tube position along the first tube and a signal from the data stream with respect to an adjacent tube position along the first tube.

5. The method of claim 4, further comprising ignoring a signal change that fails to meet a predetermined threshold.

6. The method of claim 4, further comprising ignoring a signal change between a signal from a data stream with respect to the first tube position along the first tube and a signal from the data stream with respect to the adjacent tube position along the first tube when:
at least one of the first tube position and the adjacent tube position is situated adjacent a tube sheet of the steam generator, and
the data stream indicates that a minority of the tubes among the plurality of tubes each possess a similar signal change at a similar location therein.

7. The method of claim 4, further comprising when at least one of the first tube position and the adjacent tube position is situated adjacent a tube sheet of the steam generator:
retrieving a historic signal change between a previous signal from a previous data stream with respect to the first tube position along the first tube and a previous signal from the previous data stream with respect to the adjacent tube position along the first tube;
subtracting the historic signal change from the signal change to generate a net signal change; and
employing the net signal change as the first signal anomaly.

8. The method of claim 1, further comprising detecting as the first signal anomaly a change between a signal from a data stream with respect to the first tube position along the first tube and a signal from a previous data stream with respect to the first tube position along the first tube.

9. A machine readable storage medium having stored thereon instructions which, when executed on a processor of a computing device, cause the computing device to perform the operations of claim 1.

10. The system of claim 9, wherein the instructions which, when executed on a processor, further cause the computerized device to determine the nature of the loose part.

11. The system of claim 9, wherein the instructions which, when executed on a processor, further cause the computerized device to distinguish the loose part from sludge, based at least in part on the first and second anomaly location.

12. The method of claim 1, further comprising determining the nature of the loose part.

13. The method of claim 1, further comprising removing the loose part from the steam generator.

14. A computer which can non-destructively detect an existence of a loose part within a steam generator of a nuclear power plant, the steam generator having a plurality of tubes within an interior thereof, the computer comprising:
a processor; and
a memory having stored therein one or more routines comprising instructions which, when executed on a processor, cause the computer to perform operations comprising:
detecting, via an eddy current sensor, a first eddy current indicative of an electromagnetic field through the eddy current sensor, and generating, via the eddy current sensor, a first eddy current signal indicative of the detected eddy current;
identifying in the first eddy current signal a first signal anomaly at a first tube position along a first tube from among the plurality of tubes, and converting the first tube position along the first tube into a three-dimensional first anomaly location within the interior of the steam generator;
detecting, via the eddy current sensor, a second eddy current indicative of an electromagnetic field through the eddy current sensor, and generating, via the eddy current sensor, a second eddy current signal indicative of the detected second eddy current;
identifying in the second eddy current signal a second signal anomaly at a second tube position along a second tube from among the plurality of tubes different from the first tube, and converting the second tube position along the second tube into a three-dimensional second anomaly location within the interior of the steam generator;
making a determination that the first anomaly location and the second generator location are within a predetermined proximity of one another;
determining that a loose part exists in the vicinity of the first and second anomaly locations based at least in part upon the determination that the first anomaly location and the second anomaly location are within the predetermined proximity of one another;
inspecting the steam generator in the vicinity of the first and second anomaly locations to confirm the existence of the loose part;
repairing the at least one tube of the plurality of tubes based on the inspection of the steam generator.

15. The computer of claim 14, further comprising employing a first type of detection in the identifying of the first and second signal anomalies and, responsive to the determining that a loose part exists, instructing a further analysis of at least the first and second tube positions with a second type of detection different from the first type of detection.

16. The computer of claim 14, further comprising:
identifying the first and second signal anomalies from a data stream output by a data source that contemporaneously generated the data stream and at least one alternative data stream; and
confirming the existence of the loose part by:
identifying from the at least one alternative data stream an alternative first signal anomaly at the first tube position along the first tube, and
identifying from the at least one alternative data stream an alternative second signal anomaly at the second tube position along the second tube.

17. The computer of claim 14, further comprising detecting as the first signal anomaly a signal change between a signal from a data stream with respect to the first tube position along the first tube and a signal from the data stream with respect to an adjacent tube position along the first tube.

18. The computer of claim 17, further comprising ignoring a signal change that fails to meet a predetermined threshold.

19. The computer of claim 17, further comprising ignoring a signal change between a signal from a data stream with respect to the first tube position along the first tube and a signal from the data stream with respect to the adjacent tube position along the first tube when:
  at least one of the first tube position and the adjacent tube position is situated adjacent a tube sheet of the steam generator, and
  the data stream indicates that a minority of the tubes among the plurality of tubes each possess a similar signal change at a similar location therein.

20. The computer of claim 17, further comprising when at least one of the first tube position and the adjacent tube position is situated adjacent a tube sheet of the steam generator:
  retrieving a historic signal change between a previous signal from a previous data stream with respect to the first tube position along the first tube and a previous signal from the previous data stream with respect to the adjacent tube position along the first tube;
  subtracting the historic signal change from the signal change to generate a net signal change; and
  employing the net signal change as the first signal anomaly.

21. The computer of claim 14, further comprising detecting as the first signal anomaly a change between a signal from a data stream with respect to the first tube position along the first tube and a signal from a previous data stream with respect to the first tube position along the first tube.

* * * * *